3,428,611
VISCOSITY CONTROL OF SPANDEX SOLUTIONS
Thomas K. Brotherton and John Smith, Jr., Charleston, W. Va., assignors to Union Carbide Corporation, a corporation of New York
No Drawing. Filed Feb. 23, 1967, Ser. No. 617,797
U.S. Cl. 260—75     8 Claims
Int. Cl. C08g 22/04, 53/14

ABSTRACT OF THE DISCLOSURE

A small controlled amount of water is reacted with an isocyanate-terminated prepolymer prior to the addition of diamine extender in order to regulate the viscosity of the final product.

---

Spandex polymers can be defined as any long-chain synthetic polymer composed of at least 85 percent by weight of a segmented polyurethane. The principal use of spandex polymers is in the production of elastic fibers by spinning a solution of the polymer.

Such spinning solutions can be made by reacting a diol such as a polyester diol prepared by the esterification of an alcohol with a dicarboxylic acid or anhydride; a lactone-based polyester diol, based, for example, on ε-caprolactone and tolylene diisocyanate; and polyester diols, for example, polytetramethylene ether diol or polypropylene ether diol, with an isocyanate such as methylene di-p-phenylene diisocyanate, naphthalene diisocyanate, tolylene diisocyanate, tetramethylene diisocyanate, and hexamethylene diisocyanate to form a prepolymer.

The reaction is preferably carried out in the solvent from which the fiber will be spun. Suitable solvent includes N,N-dimethylformamide, N,N-dimethylacetamide, N-methylpyrrolidone, dimethylsulfoxide, tetramethylene sulfone, and the like. To the prepolymer solution is then added a difunctional compound, commonly called a "curing compound" or "extender," which reacts with the prepolymer. Commonly used extenders include diamines such as ethylenediamine, various diols, water, aminoalcohols, and the like. These extenders are added in amounts approximately equal, on an equivalent basis, to the quantity of isocyanate in the prepolymer. The resulting product is frequently a gel with an extender such as ethylenediamine or a foam when water is the extender.

In order to achieve a product with a viscosity such that it can be spun, it is necessary that the prepolymer be highly diluted with solvent to a maximum solids content of about 15 percent by weight. Such dilution is highly uneconomic, however, and hence means have been sought whereby prepolymer solution with solids contents of 25 to 30 percent could be extended to a spinnable product. One such effort has been the use of so-called "end-blockers," monofunctional compounds which, when added to the prepolymer, react with the isocyanate group, terminating the chain. Products made in this manner, however, are not stable and the viscosity changes as the product ages.

We have now found that reduced viscosity of the spandex product solution can be controlled at relatively high solids content by the addition of small, controlled amounts of water to the reaction mixture prior to the extension reaction. In carrying out our process the isocyanate-terminated prepolymer is diluted with an appropriate solvent such as N,N-dimethylformamide and a controlled amount of water is added, the quantity of water to be selected on the basis of the number of isocyanate equivalents in the prepolymer. The mixture is agitated for a predetermined time at a controlled temperature and then an amine extender such as ethylenediamine is added. Our products are stable and, unlike the "end-blocked" materials, can be stored before use.

Spandex solutions intended for spinning ordinarily have a viscosity between about 20,000 and 200,000 centipoises. We prefer a viscosity in the 40,000 to 100,000 centipoises range. The reduced viscosity, which is a direct function of the ordinary or Brookfield viscosity for any given solids contents, is ordinarily from 0.8 to 2.0 at 30° C. in N,N-dimethylformamide (DMF) at a concentration of 0.2 gram of polymer per 100 mls. of DMF. We prefer a reduced viscosity of from 1.1 to 1.3. If an isocyanate-terminated prepolymer, diluted to 20 to 30 percent solids content, is, without further treatment, reacted with a difunctional extender such as a diamine, the viscosity of the product will be quite high, usually in excess of 200,000 centipoises. The product will thus be unsuitable for most spinning processes.

Our use of water in very small amounts prior to introduction of the amine yields a final product of the desired viscosity which is stable and thus avoids the disadvantages of materials wherein the viscosity has been controlled by other means. We add from 1 to 8 chemical equivalents of water per 10 equivalents of isocyanate. Ordinarily we let the water react with the prepolymer for up to about or just before we add the diamine extender. We prefer a reaction time of from 20 to 50 minutes. The time which thus elapses between the addition of the water and the addition of the diamine determines the extent to which the water reacts with the isocyanate groups. Complete reaction is not essential. Selecting the optimum reaction time for the quantity of water added and the viscosity desired is well within the ability of the operation of the process.

Our prefered water to isocyanate equivalents ratios for various solids contents are as follows:

| Solids content by weight, percent: | Equivalents of water to equiv. of NCO ratio |
|---|---|
| 20 | 1:10–2:10 |
| 25 | 1:10–5:10 |
| 27 | 2:10–6:10 |
| 30 | 2:10–8:10 |

Example I

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 39.4, acidity of 0.31, and a molecular weight of about 2850. The water content of the polyol was 0.015 percent.

355.5 grams (0.25 equivalent) of polyol was charged to a 3-liter glass resin flask which was equipped with 4 stainless steel baffles and a stainless steel 4-blade agitator. The material was protected from moisture by a blanket of dry nitrogen. The reaction temperature was controlled by use of a water bath. 355.5 grams of N,N-dimethylformamide, to which 250 p.p.m. by weight of phosphoric acid had been added and which contained .014% by weight of water, was added to the polyol, the mixture agitated at 1,000 r.p.m. shaft speed and the temperature adjusted to 40° C. 62.5 grams (0.50 equivalent) of methylene di-p-phenylene diisocyanate (MDI) was dissolved in 62.5 grams of N,N-dimethylformamide (DMF) (containing 250 p.p.m. phosphoric acid and .014% water) and this solution subsequently fed to the reactor. The 50% solids solution thus formed by the addition of the MDI to the polyol was agitated for 4 hours with the temperature maintained at 40° C. At the end of the 4 hour reaction period the solution was analyzed for prepolymer equivalent weight by reacting the contained isocyanate groups with excess di-n-butylamine and titrating the excess amine with hydrochloric acid. The prepolymer equivalent weights found are shown below.

678 gms. of the 50% prepolymer solution was charged to a resin flask as described above. 1035 gms. of N,N-dimethyl formamide to which 250 p.p.m. of phosphoric acid was added was weighed out and the water content of the DMF adjusted to the amounts shown below by adding water. The DMF was then added to the flask. This provided for a total solids content of 20% and a water to prepolymer NCO equivalency ratio as shown below. The solution was agitated at 26° C. for 20 minutes and ethylenediamine (EDA), 5.241 grams (0.175 equivalent) was added. The solution became viscous very rapidly and the temperature rose to about 38° C. Agitation was continued for 20 minutes after which the viscosity of the solution was determined using a Brookfield Synchro-Lectric viscometer. The viscosities of the solutions are shown below.

A total of five solutions were made in the above manner and differed only in the percent of water contained in the DMF used to dilute the 50% prepolymer solution to 20%. This was varied as shown to give the water to prepolymer NCO equivalency ratios shown.

|   | Prepolymer Eq. Wgt. | Percent H₂O in DMF | H₂O/NCO Eq. Ratio | Brookfield Viscosity (40° C.) |
|---|---|---|---|---|
| a | 4,063 | .020 | 1.35/10 | 40,250 |
| b | 4,090 | .025 | 1.70/10 | 15,250 |
| c | 4,167 | .030 | 2.06/10 | 6,340 |
| d | 4,182 | .050 | 3.50/10 | 5,000 |
| e | 4,042 | .100 | 6.00/10 | 1,260 |

Example II

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 39.4, acidity of 0.31, and a molecular weight of about 2850. The water content of the polyol was 0.015 percent.

355.5 grams (0.25 equivalent) of polyol was charged to a 3-liter glass resin flask which was equipped with 4 stainless steel baffles and a stainless steel 4-blade agitator. The material was protected from moisture by a blanket of dry nitrogen. The reaction temperature was controlled by use of a water bath. 355.5 grams of N,N-dimethylformamide, to which 250 p.p.m. by weight of phosphoric acid had been added and which contained 0.022% by weight of water, was added to the polyol, the mixture agitated at 1,000 r.p.m. shaft speed and the temperature adjusted to 40° C. 62.5 grams (0.50 equivalent) of methylene di-p-phenylene diisocyanate (MDI) was dissolved in 62.5 grams of N,N-dimethylformamide (DMF) (containing 250 p.p.m. phosphoric acid and 0.022% water) and this solution subsequently fed to the reactor. The 50% solids solution thus formed by the addition of the MDI to the polyol was agitated for 4 hours with the temperature maintained at 40° C. At the end of the 4-hour reaction period the solution was analyzed for prepolymer equivalent weight by reacting the contained isocyanate groups with excess di-n-butylamine and titrating the excess amine with hydrochloric acid. The prepolymer equivalent weight found is shown below.

685 gms. of the 50% prepolymer solution was charged to a resin flask as described above. 685 gms. of N,N-dimethyl formamide to which 250 p.p.m. of phosphoric acid was added was weighed out and the water content of the DMF adjusted to the amounts shown below by adding water. The DMF was then added to the flask. This provided for a total solids content of 25% and a water to prepolymer NCO equivalency ratio as shown below. The solution was agitated at 26° C. for 20 minutes and ethylenediamine (EDA), 5.30 grams (0.176 equivalent) was added. The solution became viscous very rapidly and the temperature rose to about 38° C. Agitation was continued for 20 minutes after which the viscosity of the solution was determined using a Brookfield Synchro-Lectric viscometer. The reduced viscosities of the solutions were determined at 40° C. in DMF at a concentration of 0.1 gram of polymer per 100 mls. of DMF. The Brookfield and reduced viscosities are shown below.

A total of six solutions were made in the above manner and differed only in the percent of water contained in the DMF used to dilute the 50% prepolymer solution to 25%. This was varied as shown to give the water to prepolymer NCO equivalency ratios shown.

|   | Prepolymer Eq. Wgt. | Percent H₂O in DMF | H₂O/NCO Eq. Ratio | Brookfield Viscosity (40° C.) | Reduced Viscosity (40° C.) |
|---|---|---|---|---|---|
| a | 4,165 | .02 | 0.7/10 | 200,000 | 1.525 |
| b | 4,268 | .03 | 1.41/10 | 100,000 | 1.255 |
| c | 4,167 | .05 | 2.32/10 | 38,800 | 1.110 |
| d | 4,185 | .10 | 4.63/10 | 22,400 | 1.055 |
| e | 4,085 | .15 | 6.7/10 | 11,600 | 0.861 |
| f | 4,171 | .20 | 8.6/10 | 8,000 | 0.775 |

Example III

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 39.4, acidity of 0.31, and a molecular weight of about 2850. The water content of the polyol was 0.015 percent.

355.5 grams (.25 equivalent) of polyol was charged to a 3-liter glass resin flask which was equipped with 4 stainless steel baffles and a stainless steel 4-blade agitator. The material was protected from moisture by a blanket of dry nitrogen. The reaction temperature was controlled by use of a water bath. 355.5 grams of N,N-dimethylformamide to which 250 p.p.m. by weight of phosphoric acid had been added and which contained .076% by weight of water, was added to the polyol, the mixture agitated at 1,000 r.p.m. shaft speed and the temperature adjusted to 40° C. 62.5 grams (.50 equivalent) of methylene di-p-phenylene diisocyanate (MDI) was dissolved in 62.5 grams of N,N-dimethylformamide (DMF) (containing 250 p.p.m. phosphoric acid and .076% water) and this solution subsequently fed to the reactor. The 50% solids solution thus formed by the addition of the MDI to the polyol was agitated for 4 hours with the temperature maintained at 40° C. At the end of the 4 hour reaction period the solution was analyzed for prepolymer equivalent weight by reacting the contained isocyanate groups with excess di-n-butylamine and titrating the excess amine with hydrochloric acid. The prepolymer equivalent weights found are shown below.

686 gms. of the 50% prepolymer solution was charged to a resin flask as described above. 686 gms. of N,N-dimethyl formamide to which 250 p.p.m. of phosphoric acid was added was weighed out and the water content of the DMF adjusted to the amounts shown below by adding water. The DMF was then added to the flask. This provided for a total solids content of 25% and a water to prepolymer NCO equivalency ratio as shown below. The solution was agitated at 26° C. for 20 minutes and ethylenediamine (EDA), 4.63 grams (.154 equivalent) was added. The solution become viscous very rapidly and the temperature rose to about 38° C. Agitation was continued for 20 minutes after which the viscosity of the solution was determined using a Brookfield Synchro-Lectric viscometer. The reduced viscosities of the solutions were determined at 40° C. in DMF at a concentration of 0.1 gram of polymer per 100 mls. of DMF. The Brookfield and reduced viscosities are shown below.

A total of two solutions were made in the above manner and differed only in the percent of water contained in the DMF used to dilute the 50% prepolymer solution to 25%. This was varied as shown to give the water to prepolymer NCO equivalency ratios shown.

|   | Prepolymer Eq. Wgt. | Percent H₂O in DMF | H₂O/NCO Eq. Ratio | Brookfield Viscosity (40° C.) | Reduced Viscosity (40° C.) |
|---|---|---|---|---|---|
| a | 4,614 | .05 | 2.57/10 | 73,500 | 1.200 |
| b | 4,615 | .10 | 5.13/10 | 32,000 | 1.055 |

Example IV

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 39.4, acidity of 0.31, and a molecular weight of about 2850. The water content of the polyol was 0.032 percent.

355.5 grams (.25 equivalent) of polyol was charged to a 3-liter glass resin flask which was equipped with 4 stainless steel baffles and a stainless steel 4-blade agitator. The material was protected from moisture by a blanket of dry nitrogen. The reaction temperature was controlled by use of a water bath. 355.5 grams of N,N-dimethylformamide to which 250 p.p.m. by weight of phosphoric acid had been added and which contained .100% by weight of water, was added to the polyol, the mixture agitated at 1,000 r.p.m. shaft speed and the temperature adjusted to 40° C. 62.5 grams (.50 equivalent) of methylene di-p-phenylene diisocyanate (MDI) was dissolved in 62.5 grams of N,N-dimethylformamide (DMF) (containing 250 p.p.m. phosphoric acid and .100% water) and this solution subsequently fed to the reactor. The 50% solids solution thus formed by the addition of the MDI to the polyol was agitated for 4 hours with the temperature maintained at 40° C. At the end of the 4 hour reaction period the solution was analyzed for prepolymer equivalent weight by reacting the contained isocyanate groups with excess di-n-butylamine and titrating the excess amine with hydrochloric acid. The prepolymer equivalent weights found are shown below.

686 gms. of the 50% prepolymer solution was charged to a resin flask as described above. 686 gms. of N,N-dimethyl formamide to which 250 p.p.m. of phosphoric acid was added was weighed out and the water content of the DMF adjusted to the amounts shown below by adding water. The DMF was then added to the flask. This provided for a total solids content of 25% and a water to prepolymer NCO equivalency ratio as shown below. The solution was agitated at 26° C. for 20 minutes and ethylenediamine (EDA), 3.87 grams (.129 equivalent) was added. The solution became viscous very rapidly and the temperature rose to about 60° C. Agitation was continued for 20 minutes after which the viscosity of the solution was determined using a Brookfield Synchro-Lectric viscometer. The reduced viscosities of the solutions were determined at 40° C. in DMF at a concentration of 0.1 gram of polymer per 100 mls. of DMF. The Brookfield and reduced viscosities are shown below.

A total of four solutions were made in the above manner and differed only in the percent of water contained in the DMF used to dilute the 50% prepolymer solution to 25%. This was varied as shown to give the water to prepolymer NCO equivalency ratios shown.

|   | Prepolymer Eq. Wgt. | Percent H₂O in DMF | H₂O/NCO Eq. Ratio | Brookfield Viscosity (40° C.) | Reduced Viscosity (40° C.) |
|---|---|---|---|---|---|
| a | 5,012 | .030 | 1.85/10 | 190,000 | 1.495 |
| b | 5,620 | .050 | 3.10/10 | 159,000 | 1.376 |
| c | 5,340 | .075 | 4.45/10 | 96,600 | 1.470 |
| d | 5,080 | .100 | 5.65/10 | 45,250 | 1.120 |

Example V

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 39.4, acidity of 0.31, and a molecular weight of about 2850. The water content of the polyol was 0.015 percent.

355.5 grams (.25 equivalent) of polyol was charged to a 3-liter glass resin flask which was equipped with 4-stainless steel baffles and a stainless steel 4-blade agitator. The material was protected from moisture by a blanket of dry nitrogen. The reaction temperature was controlled by the use of a water bath. 355.5 grams of N,N-dimethylformamide to which 250 p.p.m. by weight of phosphoric acid had been added and which contained the amounts of water shown below was added to the polyol, the mixture agitated at 1,000 r.p.m. shaft speed and the temperature adjusted to 40° C. 62.5 grams (.50 equivalent) of methylene di-p-phenylene diisocyanate (MDI) was dissolved in 62.5 grams of N,N-dimethylformamide (DMF) (containing 250 p.p.m. phosphoric acid and the amounts of water shown below) and this solution subsequently fed to the reactor. The 50% solids solution thus formed by the addition of the MDI to the polyol was agitated for 4 hours with the temperature maintained at 40° C. At the end of the 4 hour reaction period the solution was analyzed for prepolymer equivalent weight by reacting the contained isocyanate groups with excess di-n-butylamine and titrating the excess amine with hydrochloric acid. The prepolymer equivalent weights found are shown below.

686 gms. of the 50% prepolymer solution was charged to a resin flask as described above. 686 gms. of N,N-dimethylformamide to which 250 p.p.m. of phosphoric acid was added was weighed out and the water content of the DMF adjusted to the amounts shown below by adding water. The DMF was then added to the flask. This provided for a total solids content of 25% and a water to prepolymer NCO equivalency ratio as shown below. The solution was agitated at 26° C. for 20 minutes and ethylenediamine (EDA) was added at an amine to isocyanate ratio of 1.0 based on the prepolymer equivalent weight. The solution became viscous very rapidly and the temperature rose to about 60° C. Agitation was continued for 20 minutes after which the viscosity of the solution was determined using a Brookfield Synchro-Lectric viscometer. The reduced viscosities of the solutions were determined at 40° C. in DMF at a concentration of 0.1 gram of polymer per 100 mls. of DMF. The Brookfield and reduced viscosities are shown below.

A total of six solutions were made in the above manner and differed only in the percent of water contained in the DMF used to prepare the 50% prepolymer solution and to dilute the said 50% prepolymer solution to 25%. This was varied as shown to give the water to prepolymer NCO equivalency ratios shown.

27%. This was varied as shown to give the water to prepolymer NCO equivalency ratio shown.

|   | Prepolymer Eq. Wgt. | Percent H₂O in DMF | | H₂O/NCO Eq. Ratio at Dilution | Brookfield Viscosity (40° C.) | Reduced Viscosity (40° C.) |
|---|---|---|---|---|---|---|
|   |   | Prepolymer | Dilution |   |   |   |
| a | 4,165 | .02 | .02 | .93/10 | >200,000 | 1.528 |
| b | 4,058 | .03 | .03 | 1.35/10 | 72,400 | 1.232 |
| c | 4,223 | .05 | .05 | 2.33/10 | 33,400 | 1.088 |
| d | 4,309 | .075 | .075 | 3.57/10 | 28,900 | 1.031 |
| e | 4,597 | .10 | .10 | 5.11/10 | 15,000 | 0.937 |
| f | 5,584 | .15 | .15 | 9.33/10 | 9,500 | 0.880 |

Example VI

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 40.13, acidity of 0.12, and a molecular weight of about 2850. The water content of the polyol was 0.019 percent.

6000 grams (4.28 equivalents) of polyol was charged to a 5-gallon metal reactor which was equipped with 4-stainless steel baffles and a stainless steel 4-blade agitator. The material was protected from moisture by a blanket of dry nitrogen. The reaction temperature was controlled by use of a water bath. 6000 grams of N,N-dimethylformamide to which 100 p.p.m. by weight of phosphoric acid had been added and which contained .005% by weight of water, was added to the polyol, the mixture agitated at 1,000 r.p.m. shaft speed and the temperature adjusted to 40° C. 967 grams (7.73 equivalents) of methylene di-p-phenylene diisocyanate (MDI) was dissolved in 967 grams of N,N-dimethylformamide (DMF) (containing 100 p.p.m. phosphoric acid and .005% water) and this solution subsequently fed to the reactor. The 50% solids solution thus formed by the addition of the MDI to the polyol was agitated for 4 hours with the temperature maintained at 40° C. At the end of the 4 hour reaction period the solution was analyzed for prepolymer equivalent weight by reacting the contained isocyanate groups with excess di-n-butylamine and titrating the excess amine with hydrochloric acid. The prepolymer equivalent weight was found to be 4500.

810 gms. of the 50% prepolymer solution was charged to a resin flask as described above. 690 gms. of N,N-dimethyl formamide to which 100 p.p.m. of phosphoric acid was added was weighed out and the water content of the DMF adjusted to the amounts shown below by adding water. The DMF was then added to the reactor. This provided for a total solids content of 27% and a water to prepolymer NCO equivalency ratio as shown below. The solution was agitated at about 30° C. for 50 minutes and ethylenediamine (EDA) was added at an NH₂/NCO ratio of 1.0 based on the prepolymer equivalent weight. The solution became viscous very rapidly and the temperature rose to about 45° C. Agitation was continued for 30 minutes after which the viscosity of the solution was determined using a Brookfield Synchro-Lectric viscometer. The reduced viscosities of the solutions were determined at 30° C. in DMF and a concentration of .2 gm. of polymer per 100 mls. of DMF. The Brookfield and reduced viscosities are shown below.

A total of three solutions were made in the above manner and differed only in the percent of water contained in the DMF used to dilute the 50% prepolymer solution to

|   | Percent H₂O in DMF | H₂O/NCO Eq. Ratio | Brookfield Viscosity (40° C.) | Reduced Viscosity (30° C.) |
|---|---|---|---|---|
| a | .05 | 2.11/10 | 167,000 | 1.395 |
| b | .075 | 3.19/10 | 89,000 | 1.252 |
| c | .100 | 4.26/10 | 65,000 | 1.197 |

Example VII

A polyol was prepared via the reaction of three moles of a polycaprolactone diol initiated with diethylene glycol using stannous octoate as catalyst and extended to a molecular weight of about 800 with two moles of a mixture of 2,4-2,6-toluene diisocyanate. The resultant polyol had a hydroxyl number of 39.4, acidity of 0.31, and a molecular weight of about 2850. The water content of the polyol was 0.015 percent.

711 grams (.50 equivalent) of polyol was charged to a 3-liter glass resin flask which was equipped with 4-stainless steel baffles and a stainless steel 4-blade agitator. The material was protected from moisture by a blanket of dry nitrogen. The reaction temperature was controlled by use of a water bath. 711 grams of N,N-dimethylformamide to which 250 p.p.m. by weight of phosphoric acid had been added and which contained .014% by weight of water, was added to the polyol, the mixture agitated at 1,000 r.p.m. shaft speed and the temperature adjusted to 40° C. 125 grams (1.0 equivalent) of methylene di-p-phenylene diisocyanate (MDI) was dissolved in 125 grams of N,N-dimethylformamide (DMF) (containing 250 p.p.m. phosphoric acid and .014% water) and this solution subsequently fed to the reactor. The 50% solids solution thus formed by the addition of the MDI to the polyol was agitated for 4 hours with the temperature maintained at 40° C. At the end of the 4 hour reaction period the solution was analyzed for prepolymer equivalent weight by reacting the contained isocyanate groups with excess di-n-butylamine and titrating the excess amine with hydrochloric acid. The prepolymer equivalent weights found are shown below.

1472 gms. of the 50% prepolymer solution was charged to a resin flask as described above. 980 gms. of N,N-dimethyl formamide to which 250 p.p.m. of phosphoric acid was added was weighed out and the water content of the DMF adjusted to the amounts shown below by adding water. The DMF was then added to the flask. This provided for a total solids content of 30% and a water to prepolymer NCO equivalency ratio as shown below. The solution was agitated at about 35° C. for 20 minutes and ethylenediamine (EDA) was added to give an amine to isocyanate ratio of 1.0 based on the prepolymer equivalent weight. The solution became viscous very rapidly and the temperature rose to about 60° C. Agitation was continued for 20 minutes after which the viscosity of the solution was determined using a Brookfield Synchro-Lectric viscometer. The reduced viscosity of the solutions were determined at 40° C. in DMF at a concentration of .1 gm. polymer per 100 mls. of DMF. The Brookfield and reduced viscosities are shown below.

A total of three solutions were made in the above manner and differed only in the percent of water contained in the DMF used to dilute the 50% prepolymer solution to 30%. This was varied as shown to give the water to prepolymer NCO equivalency ratios shown.

| | Prepolymer Eq. Wgt. | Percent H₂O in DMF | H₂O/NCO Eq. Ratio | Brookfield Viscosity (40° C.) | Reduced Viscosity (40° C.) |
|---|---|---|---|---|---|
| a | 4,957 | .05 | 1.83/10 | >200,000 | 1.980 |
| b | 4,912 | .10 | 3.63/10 | 134,600 | 1.640 |
| c | 5,117 | .20 | 7.56/10 | 77,700 | 1.670 |

What is claimed is:

1. A process for producing a polyurethane solution having a viscosity between about 20,000 centipoises and about 200,000 centipoises which comprises (i) reacting a polymeric diol with an organic diisocyanate to produce an isocyanato terminated prepolymer, (ii) diluting said prepolymer with an organic solvent to a solids content of from 20% to 30% by weight, (iii) adding to said prepolymer solution and reacting with said prepolymer from 1 to 8 equivalents of water per 10 equivalents of isocyanate on said prepolymer, and (iv) adding to said prepolymer solution and reacting with said prepolymer an organic diamine.

2. The process according to claim 1 wherein (i) said viscosity is between 40,000 and 100,000 centipoises, (ii) said solids content is from about 25% to about 27% by weight, (iii) from 1 to 6 equivalents of water per 10 equivalents of isocyanate are added, (iv) said diamine is ethylene diamine, and (v) wherein the reaction of step (3) occurs in a period of time ranging from 20 to 50 minutes.

3. Process according to claim 1 wherein said solids content is about 20 percent by weight and from 1 to 2 equivalents of water per 10 equivalents of isocyanate are added.

4. Process according to claim 1 wherein said solids content is about 25 percent by weight and from 1 to 5 equivalents of water per 10 equivalents of isocyanates are added.

5. Process according to claim 1 wherein said solids content is about 27 percent by weight and from 2 to 6 equivalents of water per 10 equivalents of isocyanates are added.

6. Process according to claim 1 wherein said solids content is about 30 percent by weight and from 2 to 8 equivalents of water per 10 equivalents of isocyanate are added.

7. Process according to claim 1 wherein said viscosity is between 40,000 and 100,000 centipoises.

8. Process according to claim 1 wherein said solids content is from about 25 to about 27 percent by weight and from 1 to 6 equivalents of water per 10 equivalents of isocyanate are added.

References Cited

UNITED STATES PATENTS

| 2,929,800 | 3/1960 | Hill | 260—77.5 |
| 2,929,804 | 3/1960 | Steuber | 260—77.5 |
| 3,198,863 | 8/1965 | Lauer et al. | 264—184 |

FOREIGN PATENTS

| 634,289 | 1/1962 | Canada. |

OTHER REFERENCES

Japanese patent publication, Publication No. 39/2312, published on Mar. 6, 1964, 4 pages cited as being of interest.

DONALD E. CZAJA, *Primary Examiner.*

F. McKELVEY, *Assistant Examiner.*

U.S. Cl. X.R.

260—77.5, 32.6, 30.2, 30.8